United States Patent
VanHeyningen (10) Patent No.: US 7,353,380 B2
(45) Date of Patent: Apr. 1, 2008

(54) METHOD AND APPARATUS FOR PROVIDING SECURE STREAMING DATA TRANSMISSION FACILITIES USING UNRELIABLE PROTOCOLS

(75) Inventor: Marc D. VanHeyningen, Seattle, WA (US)

(73) Assignee: Aventail, LLC, a subsidiary of SonicWALL, Inc.

( * ) Notice: Subject to any disclaimer, the term of this patent is extended or adjusted under 35 U.S.C. 154(b) by 802 days.

(21) Appl. No.: 09/782,593

(22) Filed: Feb. 12, 2001

(65) Prior Publication Data

US 2003/0023845 A1    Jan. 30, 2003

(51) Int. Cl.
    *H04L 9/00*    (2006.01)
(52) U.S. Cl. .................. 713/150; 713/151; 380/28; 380/44; 726/26
(58) Field of Classification Search ........ 713/150–151, 713/201; 380/287, 262, 44, 28; 726/26
    See application file for complete search history.

(56) References Cited

U.S. PATENT DOCUMENTS

| | | | |
|---|---|---|---|
| 5,325,433 A | | 6/1994 | Torii et al. |
| 5,583,940 A | | 12/1996 | Vidrascu et al. |
| 5,657,390 A | | 8/1997 | Elgamal et al. |
| 5,673,319 A | * | 9/1997 | Bellare et al. ............... 713/181 |
| 5,754,651 A | | 5/1998 | Blatter et al. |
| 5,822,531 A | | 10/1998 | Gorczyca et al. |
| 5,974,144 A | * | 10/1999 | Brandman .................. 380/216 |
| 6,006,259 A | | 12/1999 | Adelman et al. |
| 6,038,677 A | | 3/2000 | Lawlor et al. |
| 6,061,796 A | | 5/2000 | Chen et al. |
| 6,070,245 A | | 5/2000 | Murphy, Jr. et al. |
| 6,078,957 A | | 6/2000 | Adelman et al. |
| 6,094,485 A | | 7/2000 | Weinstein et al. |
| 6,125,186 A | * | 9/2000 | Saito et al. ................. 380/287 |
| 6,141,423 A | | 10/2000 | Fischer |
| 6,148,405 A | * | 11/2000 | Liao et al. .................. 713/201 |
| 6,167,438 A | | 12/2000 | Yates et al. |
| 6,192,417 B1 | | 2/2001 | Block et al. |

(Continued)

OTHER PUBLICATIONS

U.S. Appl. No. 60/182,355, filed Feb. 14, 2000.*

(Continued)

*Primary Examiner*—Kim Vu
*Assistant Examiner*—Yin-Chen Shaw
(74) *Attorney, Agent, or Firm*—Carr & Ferrell LLP (57) ABSTRACT

The invention provides a method and apparatus for transmitting data securely using an unreliable communication protocol, such as User Datagram Protocol. In one variation, the invention retains compatibility with conventional Secure Sockets Layer (SSL) and SOCKS protocols, such that secure UDP datagrams can be transmitted between a proxy server and a client computer in a manner analogous to conventional SOCKS processing. In contrast to conventional SSL processing, which relies on a guaranteed delivery service such as TCP and encrypts successive data records with reference to a previously-transmitted data record, encryption is performed using a nonce that is embedded in each transmitted data record. This nonce acts both as an initialization vector for encryption/decryption of the record, and as a unique identifier to authenticate the record. Because decryption of any particular record does not rely on receipt of a previously received data record, the scheme will operate over an unreliable communication protocol. The system and method allows secure packet transmission to be provided with a minimum amount of overhead.

18 Claims, 8 Drawing Sheets

U.S. PATENT DOCUMENTS

| | | | |
|---|---|---|---|
| 6,195,366 B1 | 2/2001 | Kayashima et al. | |
| 6,288,739 B1 | 9/2001 | Hales et al. | |
| 6,317,831 B1* | 11/2001 | King | 713/171 |
| 6,321,268 B1 | 11/2001 | Dillon et al. | |
| 6,345,288 B1 | 2/2002 | Reed et al. | |
| 6,351,539 B1* | 2/2002 | Djakovic | 380/268 |
| 6,385,596 B1 | 5/2002 | Wiser et al. | |
| 6,502,135 B1 | 12/2002 | Munger et al. | |
| 6,505,192 B1* | 1/2003 | Godwin et al. | 707/3 |
| 6,606,663 B1 | 8/2003 | Liao et al. | |
| 6,643,260 B1* | 11/2003 | Kloth et al. | 370/235 |
| 6,754,832 B1* | 6/2004 | Godwin et al. | 713/201 |
| 6,775,772 B1* | 8/2004 | Binding et al. | 713/171 |
| 6,816,968 B1 | 11/2004 | Walmsley | |
| 2002/0023209 A1* | 2/2002 | Domstedt et al. | 713/160 |
| 2002/0083148 A1 | 6/2002 | Shaw et al. | |
| 2002/0094085 A1* | 7/2002 | Roberts | 380/262 |
| 2002/0118836 A1* | 8/2002 | Howard et al. | 380/262 |
| 2003/0167403 A1* | 9/2003 | McCurley et al. | 713/201 |
| 2004/0107286 A1* | 6/2004 | Larson et al. | 709/229 |

OTHER PUBLICATIONS

*Internet Engineering Task Force (IETF) Request For Comment (RFC)* 1928, "SOCKS Protocol V5," M. Leech et al., Mar. 1996.

*Internet Engineering Task Force (IETF) Request For Comment (RFC)* 1929, "Username/Password Authentication For SOCKS V5," M. Leech, Mar. 1996.

The Authoritative Dictionary of IEEE Standard Terms, 2000 by IEEE, Inc., Seventh Edition, pp. 505-506.

David A. McGrew, Dacid Oran, Cisco Systems et al. "The Secure Real Time Protocol." Nov. 2000. Cisco Systems IETF Standard-Working-Draft, Internet Engineering Task Force, CH XP015032291. ISSN: 000-0004.

Supplementary European Search Report in corresponding European Patent Office application, No. EP 02 71 4859, mailed Aug. 1, 2005.

"Nokia VPN Gateways: Patented IP Clustering Technology Provides True Active Session Failover and Dynamic Load Balancing," Tech Note, Nokia Connecting People.

"BCM5820 E-Commerce Processor," BCM 5820 Product Brief, Broadcom, 2000, Irvine, California.

S. Armstrong et al., "Multicast Transport Protocol," Network Working Group, Request for Commnets: 1301, Feb. 1992.

Robert Uzgalis, "Hasing Concepts and the Java Programming Language," Computer Science Departement, University of Auckland, Auckland, New Zealand, 1996.

Wireless Application Protocol, Wireless Transport Layer Security Specification, WAP WTLS WAP-199-WTLS, Version 18, Feb. 2000, 99 pages.

D. Simon: Microsoft Corporation, Microsoft Corporation's PCT Protocol, Document version 2.00, Apr. 1996, 38 pages.

E. Rescorla: "SSL and TLS, Designing and Building Secure Systems" Addison Wesley Publishing, pp. 43-55, 57-67, and 88-91, Oct. 2000.

S. Thomas: "SSL and TLS Essentials, Securing the Web" Wiley Publishing, Table of Contents pp. ix-xiii, pp. 10-11, p. 13, and pp. 118-129 (additional information from this book will be provided upon the Examiner's request), Feb. 2000.

Information printed from website (www.openssl.org/docs/apps/openssl.html) on Jul. 2, 2001, 7 pages.

Information printed from website (www.openssl.org/docs/ssl/ssl.html) on Jul. 2, 2001, 15 pages.

Information printed from website (www.openssl.org/docs/crypto/crypto.html) on Jul. 2, 2001, 2 pages.

Information printed from website (www.openssl.org/docs/HOWTO/) on Jul. 2, 2001, 1 page.

B. Tung: "Kerberos A Network Authentication System" Addison Wesley Networking Basics Series, entire book pp. vii-164, May 1999.

Information printed from website (www.broadcom.com/doc/promo5820.html) on Aug. 15, 2001, 6 pages.

* cited by examiner

FIG.5C

METHOD AND APPARATUS FOR PROVIDING SECURE STREAMING DATA TRANSMISSION FACILITIES USING UNRELIABLE PROTOCOLS

BACKGROUND OF THE INVENTION

1. Technical Field

This invention relates generally to data transmission schemes and protocols. More particularly, the invention provides a method and apparatus for securely transmitting data between two or more computer nodes using an unreliable protocol such as User Datagram Protocol (UDP).

2. Related Information

Figure 1A:
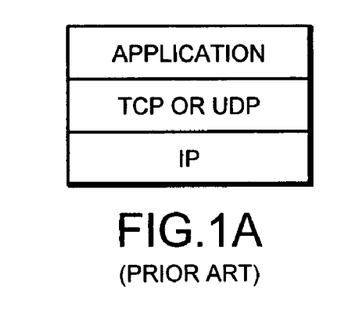
FIG. 1A shows a conventional approach for transmitting data packets using either TCP or UDP in combination with IP.

The well-known Transmission Control Protocol/Internet Protocol (TCP/IP) has been used for many years to transmit data packets between computers. TCP provides a guaranteed delivery and ordering scheme for data packets, such that two or more computers using TCP can rely on the protocol to ensure that any given packet will reach its destination in the order in which it was transmitted. Internet Protocol (IP) generally provides a point-to-point packet transmission service without guaranteed delivery. FIG. 1A shows how an application program can be layered on top of TCP/IP according to a conventional protocol stack. The popular HyperText Transport Protocol (HTTP) relies on the existence of a TCP connection between a client's browser and a server computer in order to fetch and display web pages.

Although TCP provides guaranteed delivery capabilities using built-in mechanisms (i.e., each application need not concern itself with reliability details), one disadvantage of using TCP is that it can incur delays and other side effects when transmitting a stream of data. For example, if two computers use TCP to transmit a packetized video stream, the received packets may appear "jerky" because missing or dropped packets must be re-transmitted before they can be re-ordered into the received packet stream. Consequently, TCP is not a good candidate for streaming data, such as videoconferencing applications.

The well-known User Datagram Protocol (UDP) provides a packet-oriented transmission service for communicating between two computers. In contrast to TCP and other guaranteed-delivery protocols, packets transmitted using UDP are not guaranteed to arrive at the destination computer. Moreover, packets that are transmitted in a particular order may arrive at the destination computer out of order. Thus, UDP is termed an "unreliable" transport protocol. In contrast to TCP and other guaranteed-delivery protocols, however, UDP provides a more time-sensitive delivery scheme, making it more suitable for streaming media such as video data.

As applications such as videoconferencing have increased the importance of streaming media, a need has arisen to provide secure streaming transmission facilities. For example, many corporations need to transmit streaming video between a headquarters facility and one or more remote offices. The transmission may include sensitive information that the company needs to protect from unintended recipients or eavesdropping. Because neither TCP nor UDP provide such security, they may be insufficient in themselves for such transmissions.

In recent years, various attempts have been made to provide secure transmission facilities by enhancing guaranteed-delivery protocols with encryption techniques. For example, the Secure Sockets Layer (SSL) is a protocol that provides a secure channel between two machines. The secure channel is transparent yet encrypted between client and server, such that nearly any protocol that can be run over TCP can be run over SSL with only minimal modifications. Indeed, SSL/TLS security and fault detection rely on TCP (or a similar guaranteed delivery protocol) to order packets and guarantee delivery. After undergoing various revisions, SSL was renamed Transport Layer Security (TLS) and adopted by the Internet Engineering Task Force (IETF), as reflected in RFC 2246. (The term SSL/TLS will be used to refer collectively to these two closely related protocols). A principal application of SSL/TLS is on-line shopping, wherein consumers transmit sensitive credit card information using HTTP protocols and web browsers in a secure manner.

Figure 1B:
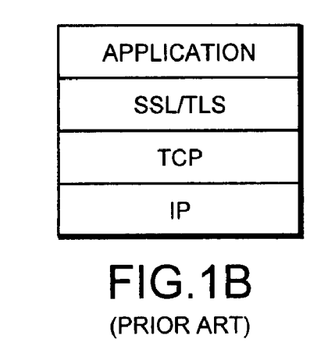
FIG. 1B shows a conventional approach for transmitting secure data using SSL/TLS in combination with TCP/IP.

Because most Internet protocols operate over TCP connections, SSL/TLS provides a convenient scheme for securely transmitting data between two or more computers. FIG. 1B shows architecturally how an application can use SSL/TLS to transmit secure data over a reliable connection such as TCP. As is conventional, the steps for securely transmitting data using SSL/TLS generally include the following:

(1) a client establishes a TCP connection with a server computer;

(2) the client and server use SSL/TLS protocols to exchange credentials (including an SSL/TLS handshake; negotiation of protocol mechanisms; and establishment of per-connection keys); and (3) each HTTP request (e.g., GET) is converted into an SSL/TLS record having encrypted content.

Figure 1C:
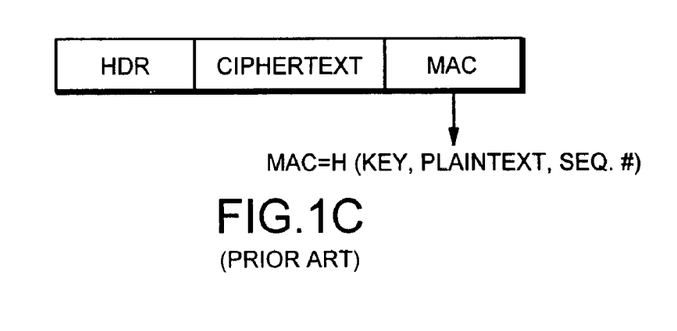
FIG. 1C shows a conventional record format for SSL/TLS record, including a header field, an encrypted ciphertext field, and a message authentication check (MAC).

FIG. 1C shows a sample SSL/TLS record, which generally includes a header (HDR), encrypted data or ciphertext, and a MAC (Message Authentication Check). The MAC ensures message integrity by means of a keyed hash, similar to a strong checksum, and is generally calculated as a function MAC=h(key, plaintext, sequence number), where the sequence number is a one-up counter for successive records. The sequence number forms an important aspect of the MAC calculated by TLS, since it prevents so-called "splicing attacks" that could otherwise occur if a hacker attempted to intercept and re-order packets in an attempt to decrypt or disrupt secure communication between computers using TLS. If the recipient's TLS detects an incorrect sequence number for a received record, it will reject the record as an attempted breach and terminate the connection. This requires that the sender and recipient re-establish another TCP connection, which results in wasted time and resources.

Because of its transparent nature, any TCP-based protocols (e.g., HTTP, FTP, etc.) or any similar guaranteed delivery protocol can be operated over TLS. Further details of SSL and TLS are provided in a book entitled "SSL and TLS: Designing and Building Secure Systems," by Eric Rescorla, ISBN 0-201-61598-3, published by Addison Wesley.

Unfortunately, reliance on TCP or other guaranteed-delivery protocols renders SSL/TLS susceptible to the same performance problems that TCP incurs. For example, using SSL/TLS to transmit streaming video data incurs the same costs and penalties (e.g., "jerky" video) that the underlying TCP incurs. By its nature, SSL/TLS requires the use of a reliable connection such as provided by TCP, because they will terminate a connection if a packet is dropped or received out-of-order.

In recent years, a protocol known as Private Communication Technology (PCT) was proposed, although it was never commercially successful. PCT was an attempt to extend SSL to secure datagram traffic (using so-called "stream cipers"). For example, PCT used a different header format (4 bytes, 2 length and 2 record type) from SSL (5 bytes, 1 record type, 2 version number, 2 length). The handshaking message bodies also contained a different beginning format; PCT used 4 bytes (2 handshake type, 2 record flags), while SSL uses only 1 byte (handshake type). PCT datagram support used the following format:

2 bytes of key_length
(key_length) bytes of key data
(data_length) bytes of encrypted data
(mac_length) bytes of MAC data, whereas SSL's datagram support is formatted as follows:
(data_length) bytes of encrypted data
(mac_length) bytes of MAC
(padding_length) bytes of padding
1 byte of padding_length
(nonce_length) bytes of nonce.

PCT specified a mechanism in which every datagram has a new encryption key created by hashing a master key with the ENCRYPTED_KEY_1_DATA (a random value is assigned to each record that is part of DK_ENCRYPTED_KEY_DATA).

The proposed PCT mechanisms imposed various performance tradeoffs. For example, although the PCT mechanism could be used with stream ciphers, it is likely to be much slower, because of additional hashing and key schedule creation to process every single record. In other words, it uses a different key for every datagram, which is computationally costly. Key schedule setup can be expensive for some block ciphers. Moreover, PCT did not provide a mechanism for integration with the SOCKS or other multi-protocol proxies.

Conventional wisdom states that UDP is not suitable for secure communications. The Rescorla book identified above, for example, specifically states that "UDP does not [provide reliable transport] and so SSL cannot be successfully run over UDP, because records might be arbitrarily lost or reordered, which would look like an active attack to the SSL implementation." Consequently, the prior art teaches away from using UDP in combination with SSL to transmit secure data. Yet UDP would be a good match for many streaming media applications, which can tolerate occasionally dropped data packets, but not delays that occur in TCP. For example, a videoconference that is broadcast in real-time can tolerate an occasionally missing video frame, but not the "jerkiness" that occurs when missing packets are retransmitted and reordered. Moreover, user session terminations occur frequently with standard UDP sent over standard SSL.

Some protocols rely on both TCP and UDP to transmit high-performance data, such as video or audio streaming. REALAUDIO, for example, is believed to use both TCP and UDP, wherein TCP is used for signaling (e.g., start/stop), while UDP is used to transmit data packets for the streaming content. However, the UDP datagrams are transmitted "in the clear," rendering them susceptible to interception or attack.

A protocol known as KERBEROS, used mainly in academic circles, provides security by encrypting UDP datagrams. The mechanism used by KERBEROS to provide datagram security is specified in RFC 1964. However, it is not compatible with SSL/TLS protocols, and thus has not found widespread use. One of the primary reasons that KERBEROS has not been commercially successful is that it is complex to operate, and not streamlined for widespread use in network processing. In particular, network-based security software must interoperate efficiently with web servers and proxy servers to control and secure user access. In general, simpler protocols have been favored for fast processing and distributed systems.

KERBEROS also uses separate encryption mechanisms, namely key establishment handshakes, to communicate secure UDP and TCP traffic. However, it may be desirable to reduce computational and network traffic overhead by integrating those under a single standard security protocol, such as SSL, running on a multiprotocol proxy server standard such as SOCKS. KERBEROS also adds a random key field for packet identification to extend the data record in a conventional manner, for purposes of initializing the encryption algorithm. However, this requires additional computation and network traffic as KERBEROS has a separate sequence number in the data record. It may be advantageous in some systems to have a single field serving both purposes.

UDP and SSL are standards in the software industry. UDP is used for processing datagrams, while SSL provides secure communication. At the same time, the adoption of multi-protocol proxy servers, such as those running the popular SOCKS protocol, provide a means for combining industry standard communications protocols such as TCP and UDP in one system. Until recently, it has not been possible to do so because of the incompatibility of UDP and SSL. To understand this problem and the limitations it creates for management of network communications under a single proxy server protocol such as SOCKs, it is first necessary to understand how SOCKS processes information.

Figure 2:
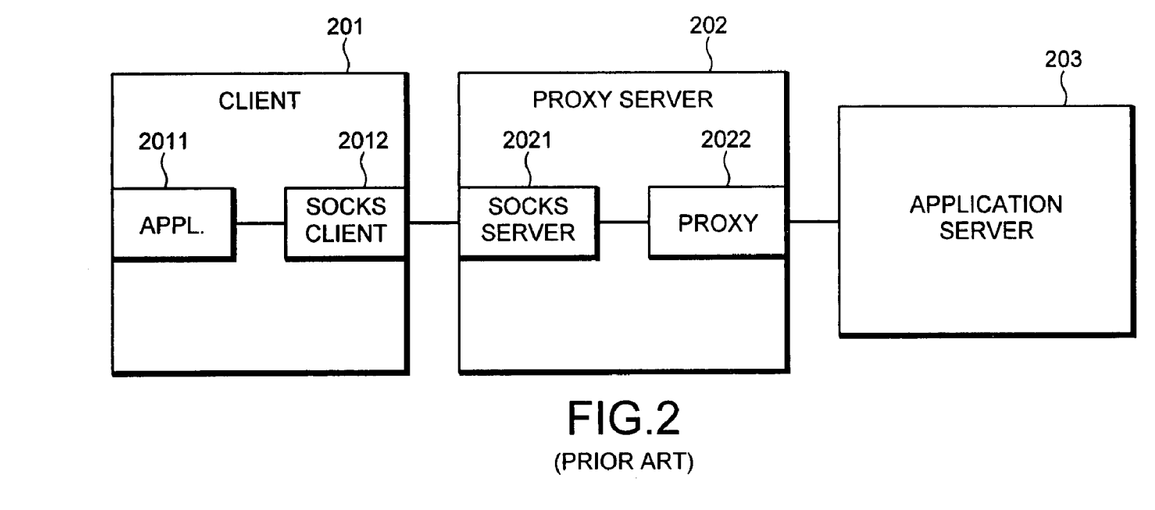
FIG. 2 shows a conventional approach for interfacing a client computer 201 to a server computer 203 through a proxy server 202 using the SOCKS protocol.

The SOCKS protocol provides a generic proxying protocol for traversing firewalls and other boundaries. Version 5 of this protocol, described in IETF RFC 1928, provides features such as authentication and UDP support. FIG. 2 shows a conventional approach for connecting to a server through a firewall by means of a proxy server and the SOCKS protocol. As shown in FIG. 2, a client computer 201 communicates with an application server 203 through a proxy server 202. The system may include a firewall (not shown) that acts as an application-layer gateway between networks. Application server 203 typically offers TELNET, FTP, SMTP, and HTTP access. Client computer 201 includes an application 201A (e.g., a web browser) and a SOCKS client 201B. Proxy server 202 includes a SOCKS server 202A and a proxy function 202B. In accordance with SOCKS version 5, which provides security features, client application 201A can obtain services from server 203 as follows.

First, client application 201A makes a request to connect to server 203B. Next, SOCKS client 201B detects the requested connection, and is aware that communication with server 203 must be handled via proxy server 202. Consequently, SOCKS client 201B sends a request to SOCKS server 202A to establish a TCP connection. Proxy function 202B establishes a connection with server 203, and all further communication between client application 201A and server function 203B goes through SOCKS server 202A and proxy function 202B. As is conventional, SOCKS uses SSL/TLS to establish a secure connection with client 201, and may demand a password before permitting the connection to be established. The architecture of FIG. 2 restricts access to server function 203B at a single point (e.g., proxy server 202) and carries some of the load of communicating with server 203 in a way that penetrates firewalls. Because they rely on SSL/TLS to provide security, the connections in FIG. 2 necessarily rely on TCP (or a similar guaranteed-delivery protocol).

The architecture of FIG. 2 can also be used to transmit nonsecure UDP datagrams. This scheme involves negotiating a UDP port "connection" between client 201 and proxy server 202, such that nonsecure UDP datagrams are transmitted through the port, whereas secure commands are transmitted over the secured SSL/TLS/TCP connection. Such a scheme has sometimes been referrred to as "naked UDP" mode, reflecting the fact that the UDP datagrams are unsecure. A system employing this technique has been commercially available from Aventail Corporation of Seattle, Wash., for several years. In general, SOCKS client 201B adds a SOCKS header to each record transmitted from client 201, which is stripped off by SOCKS server 202A before being transmitted to server 203.

As described above, it is not possible to securely transmit UDP datagrams in the context of SSL/TLS, due to SSL/TLS's reliance on TCP to provide a reliable connection service. However, it would be advantageous to provide a secure UDP service in the scheme of FIG. 2, such that proxy server 202 could facilitate high-performance video streaming between client 201 and server 203 without compromising the security of the data. Consequently, one challenge is to find a way to operate both secure TCP and secure UDP through proxy server 202, preferably using SSL as the security layer and SOCKS as the multiprotocol proxy server. More generally, it would be desirable to find a way to retain compatibility with the SSL/TLS standard without incurring the overhead and disadvantages caused by their reliance on TCP.

In view of the failure of conventional attempts to providing secure data transmission facilities without incurring the penalties and overhead inherent in reliable communication protocols, there exists a need to provide such facilities to support high-bandwidth applications such as secure videoconferencing. Moreover, there is a need to provide secure data transmission services while retaining compatibility with SSL/TLS.

SUMMARY OF THE INVENTION

The present invention overcomes the aforementioned problems by providing a method and apparatus for transmitting encrypted data over an unreliable protocol, such as UDP. In one variation, a special bit is set in data records which, when received by a proxy server, cause the records to be diverted to special processing. The special processing may include use of a nonce to detect the existence of repeat records and use of an initialization vector that permits the proxy server to decrypt a record without reference to data in any other record. Data records that do not have the special bit set are processed according to conventional SSL/TLS processing.

Other features and advantages of the invention will become apparent with reference to the following detailed description and the figures.

DETAILED DESCRIPTION OF THE PREFERRED EMBODIMENTS

Figure 3A:
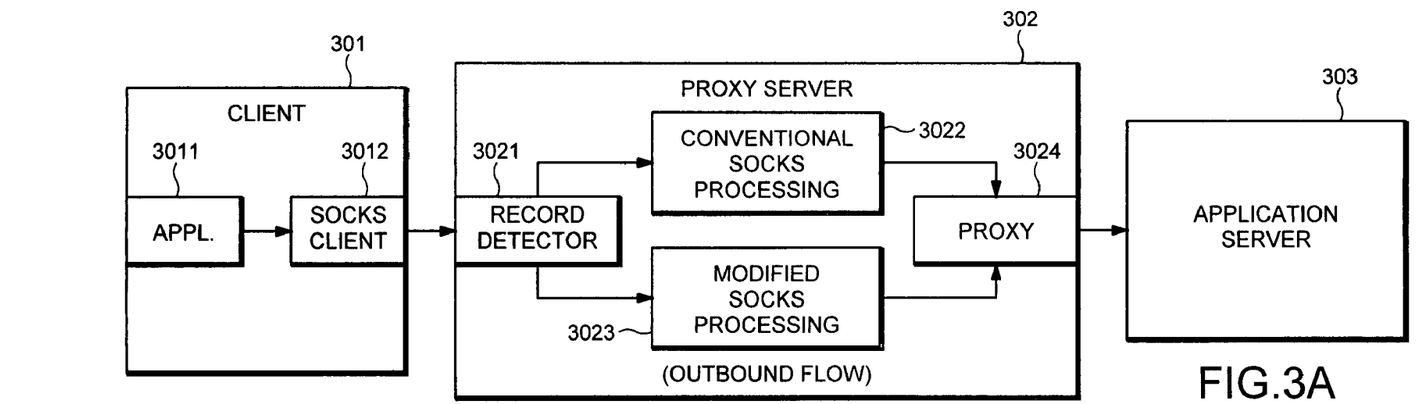
FIG. 3A shows a system employing a modified SOCKS protocol in an outbound flow direction according to one variation of the invention.

FIG. 3A shows a system employing a modified SOCKS protocol in an outbound (e.g., from client to application server) direction according to one variation of the invention. As shown in FIG. 3A, a client computer 301 communicates with an application server 303 through a proxy server 302. As in the conventional system of FIG. 2, the client computer includes a client application 301A that communicates with a SOCKS client 301B. However, in contrast to the conventional system of FIG. 2, SOCKS processing is modified to perform additional and different functions from those in the system of FIG. 2, as described in more detail below. Application server 303 operates in the same manner as that described with reference to FIG. 2.

In contrast to the system of FIG. 2, proxy server 302 includes two types of SOCKS processing: a conventional socks processing function 302B, and a modified SOCKS processing function 302C. Record detector 302A receives server-bound records from SOCKS client 301B and, depending on whether a particular bit has been set indicating that the records are "secure UDP" records, routes them through a software switch to either conventional SOCKS processing function 302B or modified SOCKS processing function 302C. Details of modified SOCKS processing function 302C are provided below.

The architecture shown in FIG. 3 allows proxy server 302 to operate either with conventional SOCKS clients such as SOCKS client 201B of FIG. 2, or with SOCKS clients that have been modified to operate in accordance with the principles of the present invention (modified SOCKS client 301B), which uses unreliable protocols such as UDP to transmit encrypted data. Moreover, both types of clients can be simultaneously accommodated. In one embodiment, both UDP and TCP protocols can be operated on the same proxy server. Further details of the modified processing are provided below. Proxy function 302D operates essentially in the same manner as proxy function 202B of FIG. 2.

There are many variations on the architecture of FIG. 3 that fall within the inventive principles. As one example, record detector 302A can be optional. As another example, if client 301 and proxy server 302 agree during an initialization sequence that all subsequent UDP datagrams between them will be transmitted according to a modified encryption scheme as described herein, it may not be necessary to flag and evaluate each record to determine whether it conforms to one protocol or the other. It is of course also possible to implicitly designate the record type by way of other fields, such that the type of record (and resulting processing) will be evident from the other fields. Of course, as with "naked UDP," a secure TCP message can be combined with the present invention to contain keys or other encryption records in support of secure UDP. Moreover, the functions of proxy server 302 can be incorporated into server 303 or another computer, rather than requiring a separate proxy server to implement these functions. Finally, it will be apparent that encrypted records can be transmitted from client computer 301 to proxy server 302 and vice versa, such that a bi-directional secure communication path is established.

Figure 3B:
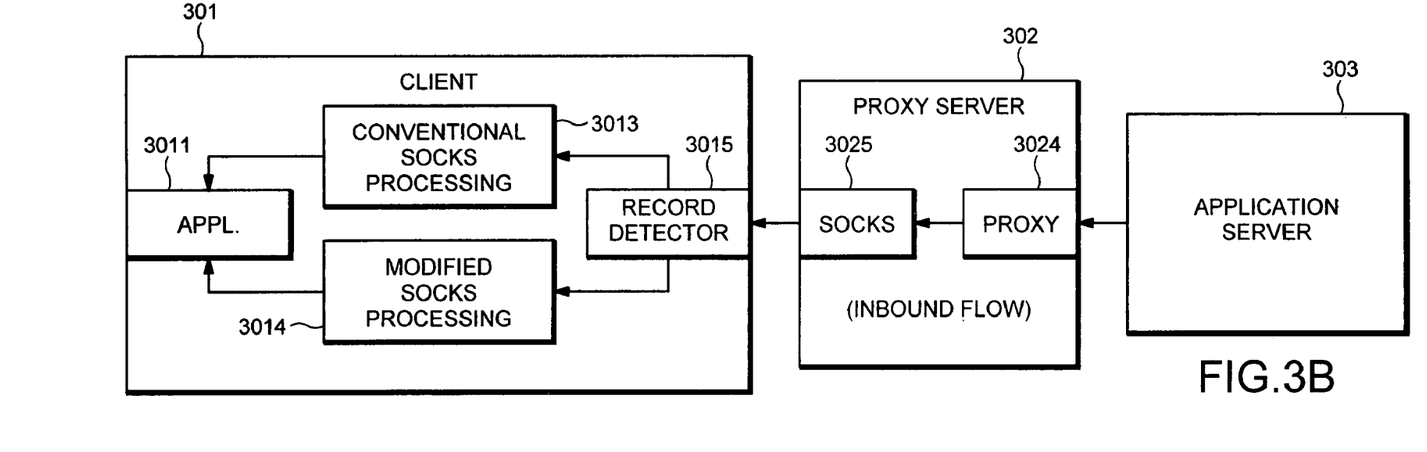
FIG. 3B shows a system employing a modified SOCKS protocol in an inbound flow direction according to one variation of the invention

FIG. 3B shows the system of FIG. 3A for an inbound (e.g., from server to client) flow direction. Records that are received through proxy 302D are forwarded to SOCKS processing function 302E, which forwards them to a client-side record detector function 301E. Record detector 301E, in response to detecting records having a secure UDP bit set, routes such records to modified SOCKS processing function 301D, and otherwise sends them to conventional SOCKS processing function 301C. It will be appreciated that the various SOCKS processing functions can be located in client 301, proxy server 302, or another computer without departing from the inventive principles.

Figure 4A:
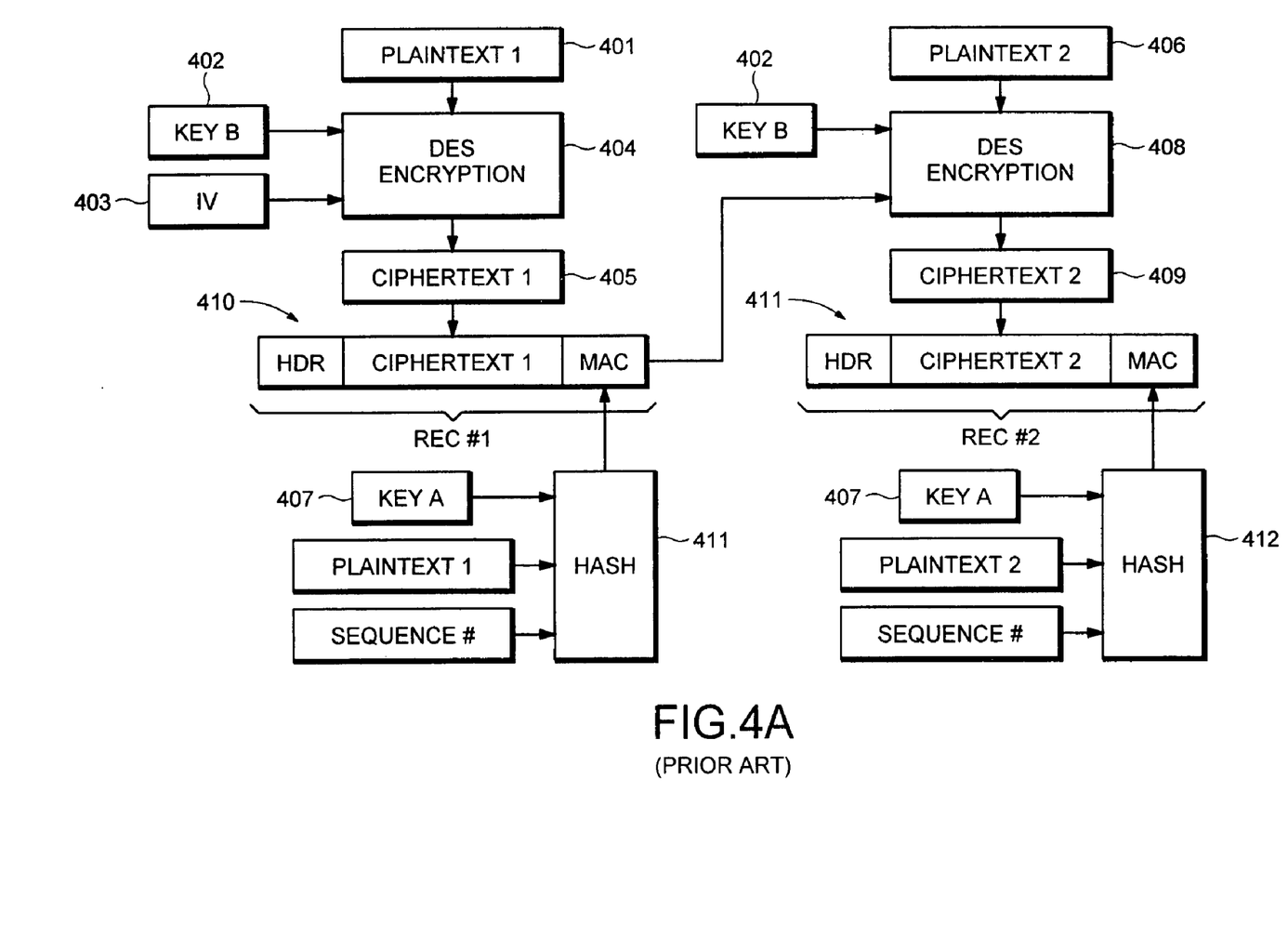
FIG. 4A shows a conventional technique for creating SSL/TLS records using encryption.

FIG. 4A shows a conventional technique for creating SSL/TLS records using encryption. Before explaining how the encryption principles of the present invention are applied, it is first necessary to briefly review how SSL/TLS performs encryption and decryption.

As shown in FIG. 4A, a first byte of plaintext 401 is encrypted using an encryption function 404, such as the conventional Data Encryption Standard (DES). A session encryption key 402 that is shared between the sender and recipient (e.g., SOCKS client 201B and SOCKS server 202A) and an initialization vector (IV) 403 are input to the encryption function 404, and the resulting encrypted ciphertext 405 is produced. In accordance with the SSL/TLS standard, this ciphertext is embedded in a record 410 including a header and a MAC that is generated via hashing function 411 as a function of key 407, the plaintext, and a sequence number that is incremented for each record. The resulting record 410 is transmitted to proxy server 202 over a TCP connection previously established as part of the initial handshaking between client 201 and proxy server 202. The first initialization vector 403 can be agreed-upon between the sender and recipient during initialization.

In accordance with the SSL/TLS standard, the next plaintext 406 is encrypted using the same key 402, but using ciphertext 405 generated from the previously transmitted record as the second initialization vector. This creates a "link" between successive records, such that if the link is broken (e.g., a packet is lost or corrupted), the scheme will fail.

Figure 4B:
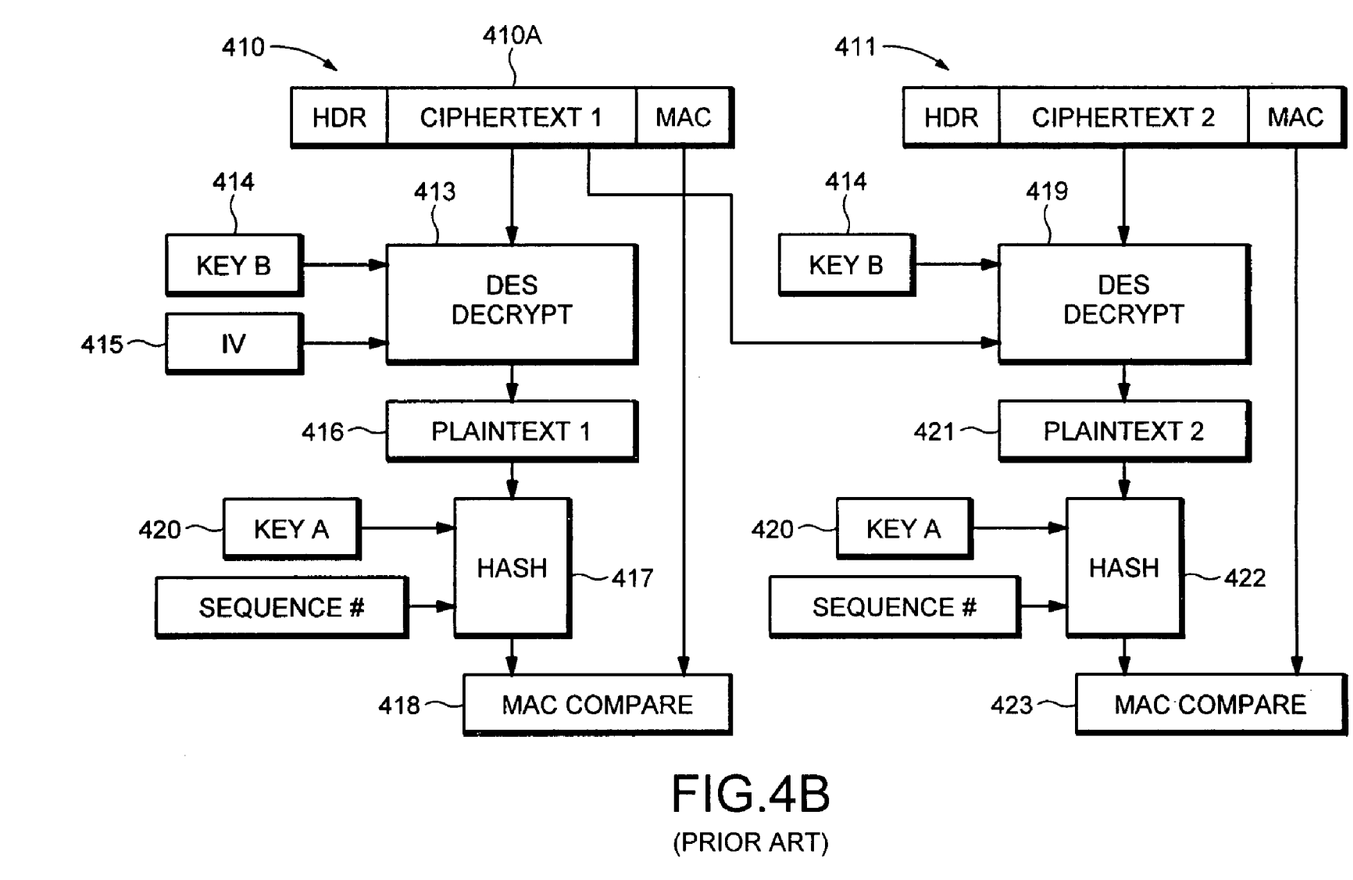
FIG. 4B shows a conventional technique for decrypting SSL/TLS records in reliance on previously decrypted records.

FIG. 4B shows the inverse process at the receiving end. At the recipient end (e.g., proxy server 202), first record 410 is decrypted as follows. The ciphertext is decrypted in decryption function 413 using a previously shared session key 414 and a previously shared initialization vector 415. The plaintext is used in a hash function 417 in combination with key 420 and one-up sequence number (independently incremented by the recipient) to generate a MAC that should match the MAC of the incoming record. If the MAC does not match, the record is discarded.

The second (and subsequent) incoming record 411 is decrypted using session key 414 but, instead of initialization vector 415, ciphertext 410A is used as the initialization vector. This matches the counterpart encryption scheme shown in FIG. 4A. As described above, if the recipient did not receive record 410 (or it was received out-of-order), the decryption will not occur properly due to reliance on the "chained" initialization vectors needed for decryption. The error will be detected by MAC comparison function 423, since the decrypted plaintext 421 will not produce a MAC that matches the MAC in the incoming record.

As explained above, the conventional SSL/TLS reliance on previously transmitted data records requires that the underlying packet transmission mechanism be completely reliable. This is referred to as "cipher block chaining," and it requires reliable transmission of records because each successive data record is encrypted in reliance on the previously generated record (with respect to DES, cipher block chaining is defined by FIPS 81). Consequently, if a record is received out of order or a data record is dropped, the encryption scheme will break down, and the sequence numbers will not match. If this happens, according to the conventional SSL/TLS scheme, the TCP connection will be terminated and a new connection will be required to re-establish data transmission. This security feature is intended to thwart hackers from interfering with the secure transmission scheme by inserting or manipulating data records between the client and proxy server. As explained above, if UDP or another unreliable protocol were used to transmit the data according to the scheme of FIG. 4, any missing or mis-ordered records would immediately cause the connection to be lost. Note that for the purposes of simplification, only a single block of ciphertext is shown in record 410 of FIG. 4. In practice, multiple blocks can be included in a single record, and the "cipher block chaining" can be performed between successive blocks in the single record.

Figure 5A:
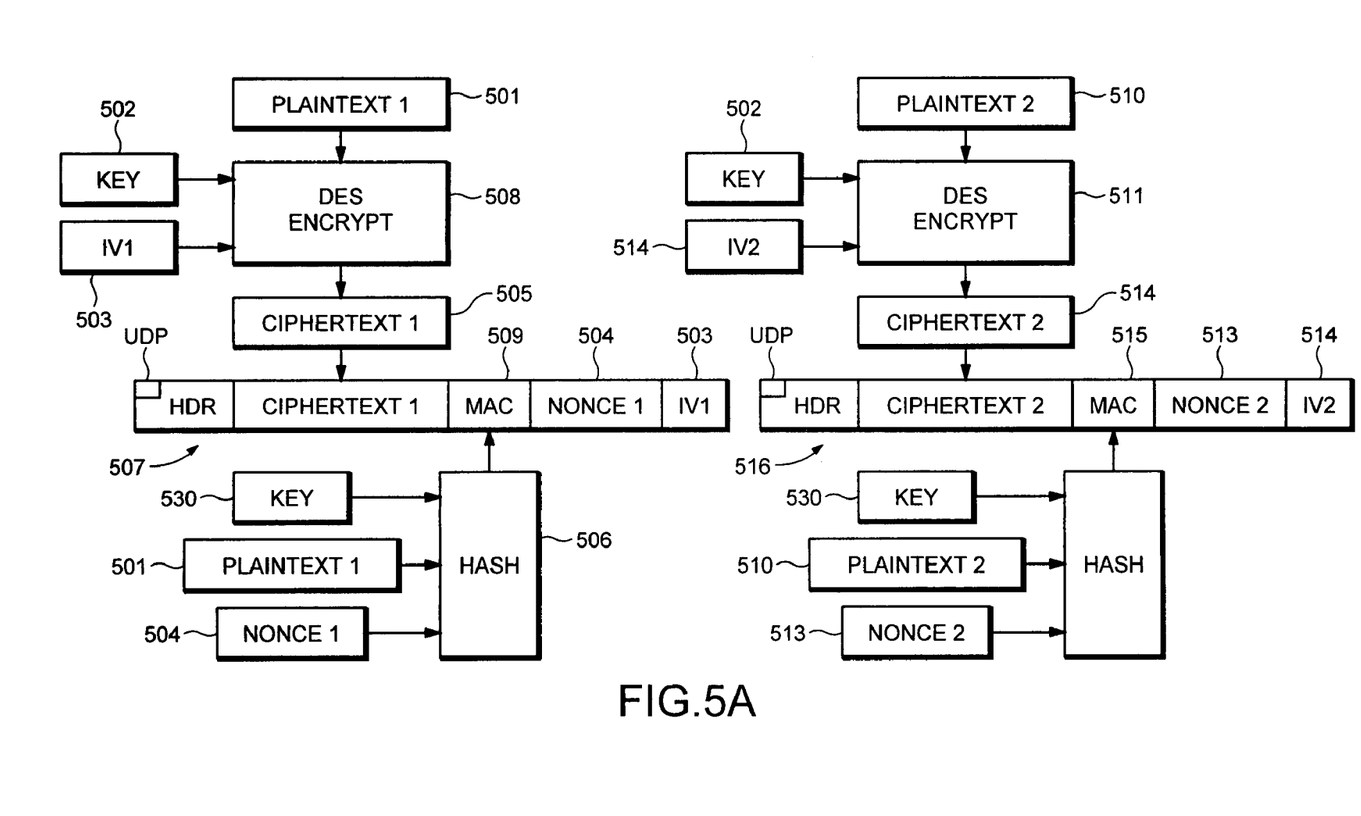
FIG. 5A shows a modified encryption scheme according to one variation of the invention, wherein each record is encrypted independently of a previously transmitted record.
Figure 5B:
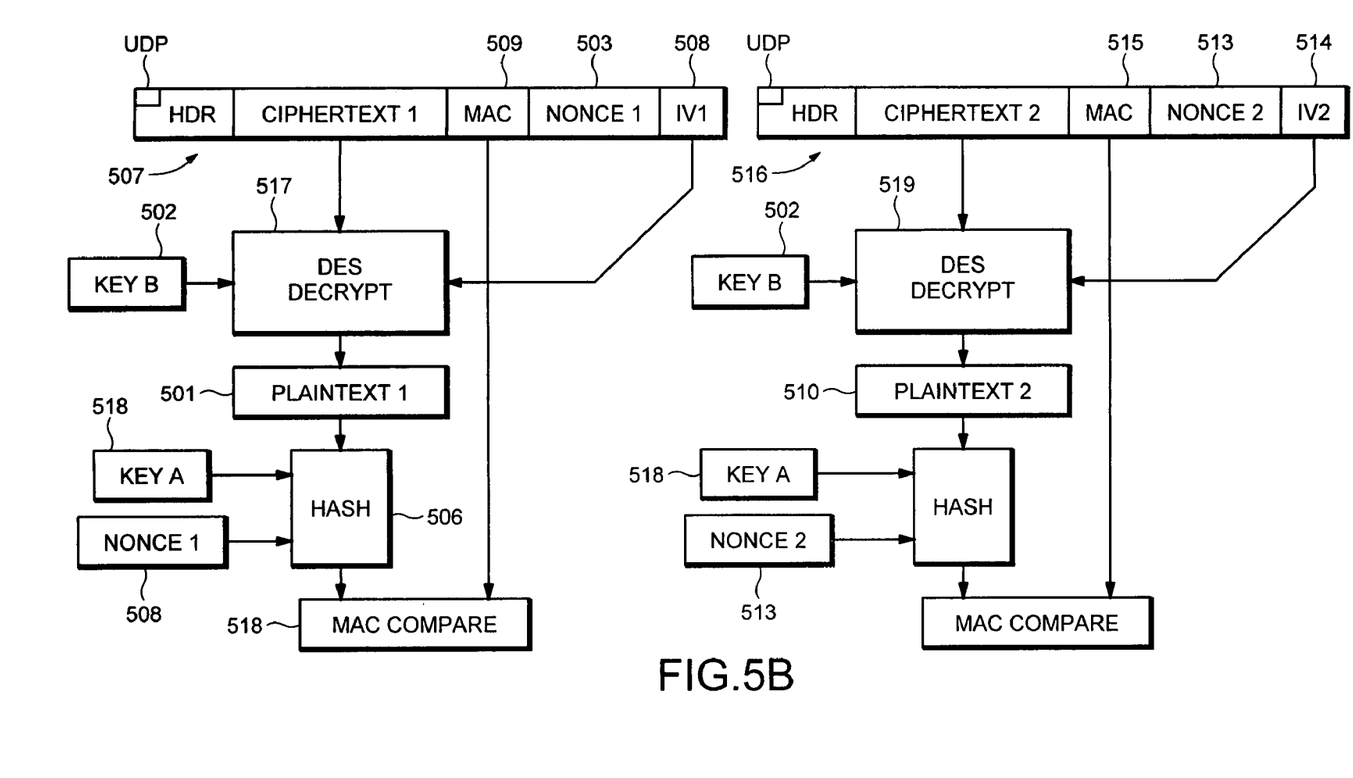
FIG. 5B shows a modified decryption scheme according to one variation of the invention, wherein each record is decrypted independently of a previously received record.

FIGS. 5A and 5B show a modified encryption and decryption scheme that can be used according to one variation of the present invention. In accordance with this variation, a slightly modified SSL/TLS record format 507 is used. A special bit (UDP) is embedded in the conventional header to indicate that the record contains encrypted UDP data and should be processed according to modified SOCKS processing function 302C. This bit can be used by record detectors 302A and 301E to determine whether any given SSL/TLS record should be routed to conventional SOCKS processing function 302B or 301C, or to modified SOCKS processing function 302C or 301D. This feature allows the principles of the invention to be applied with systems that conform to the existing SSL/TLS/SOCKS protocol, while also allowing enhanced security provisions to be used when UDP datagrams are transmitted.

As shown in FIG. 5A, plaintext 501 is encrypted using an encryption function 508, such as the conventional DES encryption algorithm. The encryption is performed using a shared session key 502 and a first initialization vector 503, resulting in ciphertext 505, which is used to create a modified SSL/TLS record 507. Plaintext 501 is also used in combination with different key 530 and a first nonce value 504 to create a MAC 509 using hashing function 506. In contrast to the encryption scheme of FIG. 4A, the record 507 includes nonce value 504 and initialization vector 503, which may comprise any preferably unique value (e.g., random numbers). According to one embodiment, a combined nonce/IV value is generated using a strong random number generator (e.g., one defined by the X9.62 standard, produced by the commercially available RSA BSAFE CRYPTO-C function).

In contrast to conventional SSL/TLS schemes, the nonce/IV value is explicitly included as part of each record so that the record can be decrypted without reliance on a previously transmitted record. In certain embodiments, the sequence number and initialization vector can be combined into a single value (the nonce), which can be an arbitrary or randomly generated number In one embodiment, the nonce is the same size as the sequence number in SSL (e.g., 8 bytes), and each value is unique (i.e., the recipient can check them against a list of previously received records). The initialization vector may comprise the same size as a block of cipher (e.g., 8 bytes), and each value can be unique. In one variation, it may be desirable to create a large Hamming distance between difference initialization vectors (e.g., random numbers where each bit has a 50% chance of changing). Instead of appending separate nonces and initialization vectors, a combined nonce/IV value can be used. A cryptographically strong random-number generator can be used to generate such numbers, such as the RSA BSAFE CRYPTO-C product sold by RSA Security, Inc.

On the right side of FIG. 5A, plaintext 510 is encrypted in a similar manner, and a separate nonce 513 and initialization vector 514 is used to created data record 516.

Turning to FIG. 5B, the decryption of records 507 and 516 will now be described. The ciphertext from record 507 is decrypted using shared session key 502 and the initialization vector 508 extracted from the data record, to produce plaintext 501. The plaintext is fed through a hash function with key 518 and the nonce 508 extracted from the data record, to produce a MAC that can be compared with the MAC 509 extracted from the record.

The second record 516 is decrypted in a similar manner, except that it does not rely on values in the previously transmitted record 507 to perform decryption. In this manner, dropped or misordered records can still be handled.

Figure 5C:
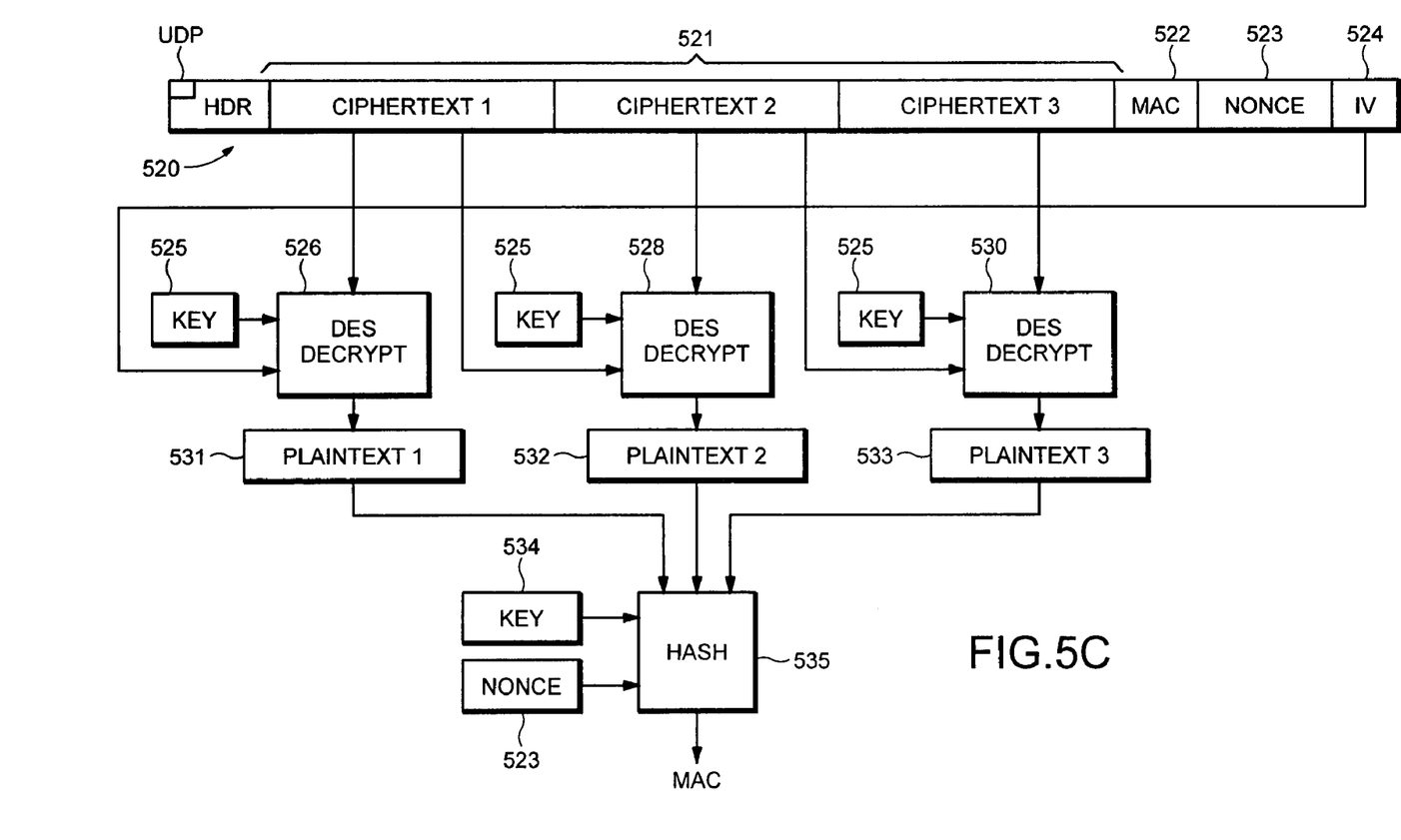
FIG. 5C shows a modified decryption scheme including multiple cipher blocks within a single record.

According to a variation of the invention illustrated in FIG. 5C, multiple cipher blocks 521 can be included in a single record, and the ciphertext for each block can be decrypted with reference to the previous cipher block. The first ciphertext is decrypted in decryption function 526 using initialization vector 524, whereas successive ciphertext blocks are decrypted using the ciphertext of the previous block (generally, encryption would operate in an inverse manner). A single MAC value can be calculated on the basis of concatenated plaintext blocks 531, 532, and 533.

As described above, the nonce and IV can be combined into a single value, such that the same value is used both as an IV and as a unique identifier for MAC calculation.

In one variation, the explicitly transmitted nonce is used to determine whether a previously received record has been received a second time. If so, the protocol optionally terminates the connection or generates a warning, since such a situation might be indicative of a hacker attack by so-called "replaying" packets." Note that the latter is different from conventional SSL/TLS, which terminates the connection if a sequence number is received out of order. Moreover, in certain embodiments the sequence number checking can be disabled or not used.

According to one aspect of the present invention, in contrast to conventional SSL/TLS, initialization vectors are not chained across records. Each record includes a unique initialization vector, and ciphertext blocks are chained together within a record as is conventional.

The use of a special UDP bit is only one technique for identifying records as conventional or modified SSL/TLS records. In one embodiment, no bit at all is needed, and the assumption is made that every record conforms to the modified SSL/TLS protocol as described herein. In other embodiments, different flags or methods can be used to signify that a particular record should be processed according to the modified scheme set forth above. As one example, during the initial handshaking that occurs between client and proxy server, a message can be sent indicating that subsequent records will be received according to the aforementioned protocol. In another embodiment, secure TCP can be used to exchange a set of MAC or IV values, equivalent to the nonce, for comparison and identification of the data record.

It should also be recognized that unreliable protocols other than UDP can be used to carry out the inventive principles, and the invention is not limited to UDP datagrams. Moreover, it should be appreciated that other encryption algorithms other than DES (e.g., AES) could be used, and the invention is not limited in this respect.

Figure 6:
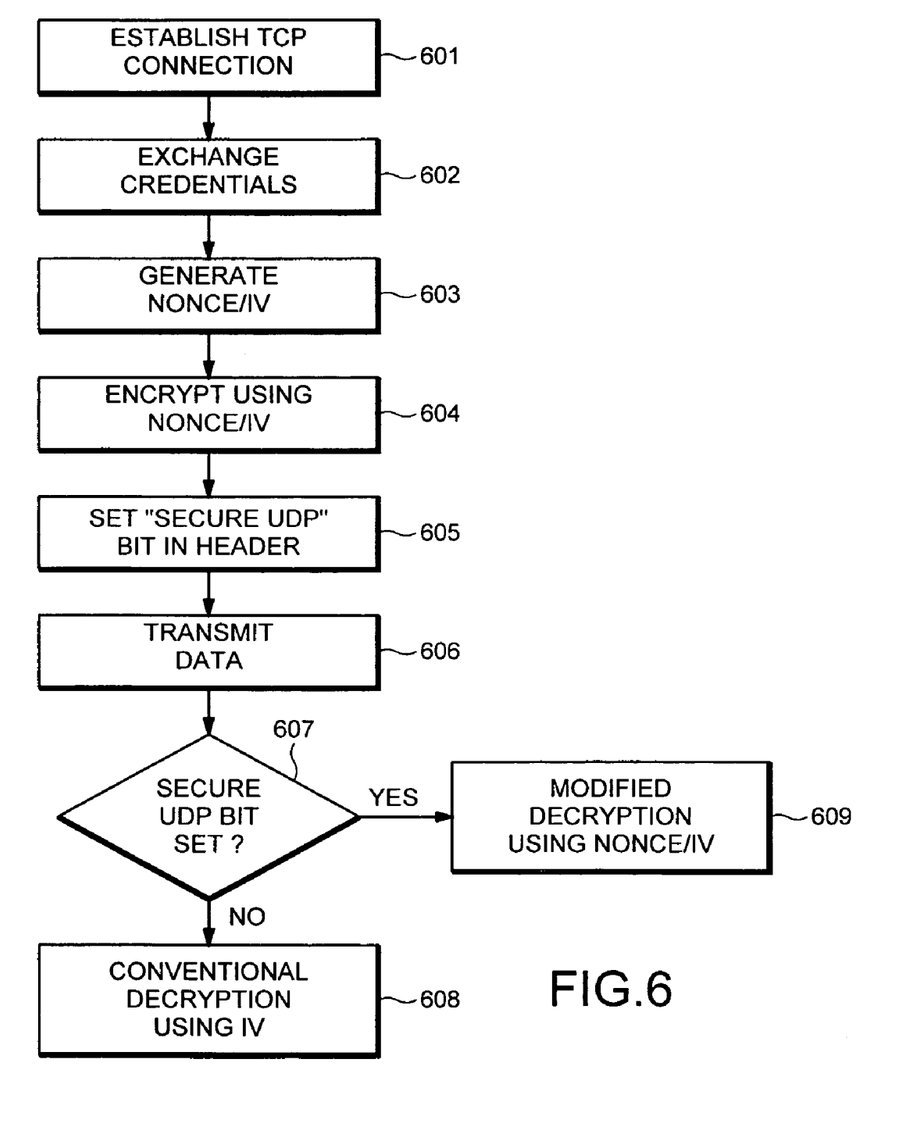
FIG. 6 shows various steps of a method that can be used to create and transmit encrypted records according to various principles of the invention.

FIG. 6 shows various steps of a method that can be used to practice the principles of the invention. Note that the use of proxy server 302 is entirely optional, and the functions illustrated therein can of course be implemented in client computer 301, server computer 303, or another computer. Alternatively, the inventive principles can be practiced using any protocols that provide unreliable packet transmission (e.g., Internet Protocol), even without the constraints of the SOCKS protocols. While the examples given above reflected transmission of secure UDP data client 301 to server 303, the example in FIG. 6 assumes that server 303 transmits UDP datagrams to proxy server 302, which encrypts them and sends them to client 301.

Assume that a client wants to receive secure video data from an application server using the architecture shown in FIG. 3B. That is, server 303 will transmit a stream of unreliably transmitted data using UDP to client 301 through proxy server 302, which will ensure that the records are sent in encrypted form to client 301. Beginning in step 601, the client and proxy server establish a TCP connection. This step is conventional, and conforms to the SOCKS protocols. In step 602, the client and proxy server exchange credentials (e.g., they negotiate security parameters) according to conventional SSL schemes. In one variation of the invention, client 301 and proxy server 302 also agree that UDP datagrams will be transmitted in encrypted form according to the principles described above. This can be done by transmitting a TCP packet (new) indicating that secure UDP datagrams will be transmitted using a particular port. The client can also send the server information regarding the target application server (e.g., IP address and port). Note that although steps 601 and 602 are described as being performed using a reliable protocol, they can of course be implemented using an unreliable protocol, as long as the information needed for the encryption steps can be shared or communicated between computers in some manner.

In step 603, a nonce/IV is generated, using for example a random-number generator. In step 604, a UDP datagram received from server 303 is encrypted using the nonce, and the other fields shown in FIG. 5 are generated as required. For example, each block of ciphertext can be chain-block-encrypted using the plaintext from the previous byte as the initialization vector, and the MAC can be generated as is conventional. Moreover, the nonce can be appended to the record as illustrated in FIG. 5.

In step 605, a "secure UDP" bit is set in the record header to indicate that the record has been encrypted according to the modified SSL/TLS/SOCKS protocol. As explained above, this bit is optional, since the encryption information can be indicated in various other ways. Finally, in step 606, the record is transmitted from proxy server 302 to client 301. In step 607, the record is received in record detector 301E and, if the secure UDP bit is set, the record is decrypted in step 609 according to the modified SOCKS processing outlined above. Otherwise, in step 608 the record is decrypted according to conventional SOCKS processing.

Thus has been described a system and methods for transmitting data securely using an unreliable protocol, such as UDP. The invention can be used in a wide variety of systems and applications, including videoconferencing; streaming media (including audio, video, or both); bulk transfers of files; computer games over the Internet (including near-realtime gaming systems); Internet telephony; cellular telephone transmission; wireless LANS; and other system. The invention can provide advantages in the form of lower power consumption and less computer processing because the use of the inherently less complex and unreliable communication protocols (e.g., UDP, IP, and others) reduces the overhead and processing needed to transmit data securely. The invention can be used not only for communicating over the Internet, but for use in other computer networks, such as local area networks (e.g., Ethernet), peer-to-peer networks, and the like. It is also suitable for securing various data types, including nonstreaming media, although its principal application is with UDP traffic for streaming media.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments, such as a distributed computer network environment, a single stand-alone computer system environment, or other computing environments. Additionally, although the present invention has been described using a particular series of transactions and steps, it should be apparent to those skilled in the art that the scope of the present invention is not limited to the described series of transactions and steps.

There is inherent flexibility in creating the logic, system flow, tables, and data structures used for programming the present invention. Data structures and values upon which calculations are performed may be explicit, derived from other data, imported from other sources, or result from program calculations or logical operations, all without departing from the spirit or limiting the scope of the invention. The algorithms for indexing, searching and data processing in this patent may be substituted or modified to support various performance and/or systems integration requirements, all without deviating from the spirit or limiting the scope of the invention.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Reference numerals in the appended method claims identifying steps are for convenience only and are not intended to imply a necessary ordering of the steps. It is, therefore, to be understood that within the scope of the appended claims the invention may be practiced otherwise than as specifically described. No claim should be interpreted to be in means-plus-function format.

The invention claimed is:

1. A method of transmitting data securely over a computer network, comprising the steps of:
   (1) establishing a communication path between a first computer and a second computer;
   (2) encrypting and transmitting data records between the first computer and the second computer using an unreliable communication protocol, wherein each data record incorporates a nonce and encrypted text that has been encrypted using the nonce and a shared encryption key and without reference to a previously transmitted data record; and
   (3) in the second computer, receiving and decrypting the data records transmitted in step (2) by, for each of the received data records, decrypting the incorporated encrypted text using the incorporated nonce in combination with the shared encryption key and without reference to a previously received data record,
   wherein step (2) comprises the step of embedding an indicator in each of the data records indicating that the data records are encrypted according to an encryption scheme that encrypts records without regard to any previously transmitted data records, and
   wherein step (3) comprises the step of determining whether the indicator is present in each record and, in response to determining that the indicator is not present, processing each such record differently than if the indicator is set.

2. The method of claim 1, wherein step (1) is performed using the Transmission Control Protocol, and wherein step (2) is performed using the User Datagram Protocol.

3. The method of claim 1, wherein step (2) is performed by a proxy server that encrypts data records received from another server.

4. A system for securely transmitting data using an unreliable protocol, comprising:
   a first computer comprising a communication protocol client function operable in conjunction with an application program to transmit data records securely using an unreliable protocol; and
   a second computer coupled to the first computer and comprising a communication protocol server function operable in conjunction with the communication protocol client function to receive data records securely using the unreliable communication protocol,
   wherein, for each data record, the communication protocol client function encrypts text for the data record using a nonce and an encryption key and incorporates the respective encrypted text and nonce in the data record;
   wherein the communication protocol server function decrypts the encrypted text in each of the data records using the respectively appended nonce and the encryption key; and wherein the second computer comprises a record detector that determines whether an indicator has been set in each data record received from the first computer and, if the indicator has not been set, bypasses decryption in the server computer.

5. The system of claim 4, wherein the communication protocol client function exchanges encryption credentials with the communication protocol server function using a reliable communication protocol.

6. The system of claim 5, wherein the unreliable communication protocol comprises the User Datagram Protocol, and wherein the reliable communication protocol comprises the Transmission Control Protocol.

7. The system of claim 4, wherein the communication protocol client function and the communication protocol server function are compatible with the SOCKS communication protocol.

8. The system of claim 4, wherein the communication protocol client function and the communication protocol server function are compatible with the SSL/TLS communication protocol.

9. The system of claim 4, wherein the second computer comprises a proxy server that forwards the decrypted text to a server computer.

10. A method of transmitting data securely over a computer network, comprising:
   establishing a communication path with a remote computer;
   encrypting data records using a nonce and a shared encryption key such that each data record incorporates the nonce, and
      text that is encrypted such that the remote computer can decrypt the encrypted text by using the incorporated nonce in combination with the shared encryption key and without reference to a previously received data record; and
   transmitting the encrypted data records to the remote computer using an unreliable communication protocol,
   wherein encrypting the data records includes embedding an indicator in each of the data records indicating that the data record incorporates text encrypted according to an encryption scheme that encrypts text without regard to any previously transmitted data records, such that the remote computer can determine whether the indicator is present in each received data record and, in response to determining that the indicator is not present, process each such received data record differently than if the indicator is set.

11. The method of claim 10, further comprising establishing a reliable communication path to the remote computer and exchanging security credentials with the remote computer over the reliable communication path.

12. The method of claim 11, wherein the step of exchanging security credentials includes exchanging an encryption key that is used to encrypt the text.

13. The method of claim 10, wherein the nonce includes a random number.

14. The method of claim 10, wherein
   establishing the communication path with the remote computer is performed using the Transmission Control Protocol; and
   encrypting data records is performed using the User Datagram Protocol.

15. The method of claim 10, wherein encrypting the data records is performed by a proxy server that encrypts text received from another server.

16. A method of transmitting data securely over a computer network, comprising:
   establishing a communication path with a remote computer;
   receiving data records
      transmitted from the remote computer using an unreliable communication protocol, and
      encrypted using a nonce and a shared encryption key such that
         each data record incorporates a nonce and
         text that is encrypted without reference to a previously encrypted data record; and
   decrypting the received data records by using the nonce in combination with the shared encryption key to decrypt each received data record without reference to a previously received data record,
   wherein the received encrypted data records include an indicator indicating that the data records incorporate text that has been encrypted according to an encryption scheme that encrypts records without regard to any previously transmitted data records, and
   further comprising determining whether the indicator is present in each received data record and, in response to determining that the indicator is not present in a received data record, processing such received data record differently than if the indicator is set.

17. The method of claim 16, wherein
   establishing a communication path with a remote computer is performed using the Transmission Control Protocol, and
   receiving the encrypted data records is performed using the User Datagram Protocol.

18. The method of claim 16, wherein the received data records are received from a proxy server that encrypts data records the proxy server received from another server.

* * * * *